(12) United States Patent
Härtel et al.

(10) Patent No.: US 6,572,178 B2
(45) Date of Patent: Jun. 3, 2003

(54) DASHBOARD SUPPORT WITH VIBRATION-DAMPING FEATURE

(75) Inventors: Wulf Härtel, Altenbeken (DE); Bjorn Schaffranek, Börchen (DE); Andreas Wille, Paderborn (DE)

(73) Assignee: Benteler Automobiltechnik GmbH & Co. KG, Paderborn (DE)

( * ) Notice: Subject to any disclaimer, the term of this patent is extended or adjusted under 35 U.S.C. 154(b) by 0 days.

(21) Appl. No.: 10/099,863

(22) Filed: Mar. 14, 2002

(65) Prior Publication Data

US 2002/0130533 A1 Sep. 19, 2002

(30) Foreign Application Priority Data

Mar. 16, 2001 (DE) ......................... 101 12 738

(51) Int. Cl.⁷ ............................... B60R 27/00
(52) U.S. Cl. ................ 296/187; 296/194; 296/70; 180/90
(58) Field of Search ................ 296/187, 188, 296/189, 194, 203.02, 70; 180/90

(56) References Cited

U.S. PATENT DOCUMENTS

| 4,398,173 A | * | 8/1983 | Kulischenko et al. ....... 180/271 |
| 4,432,565 A | * | 2/1984 | Suzuki et al. .................. 180/90 |
| 5,315,203 A | * | 5/1994 | Bicos ......................... 310/326 |
| 5,934,733 A | * | 8/1999 | Manwaring ............ 296/203.02 |
| 6,176,544 B1 | * | 1/2001 | Seksaria et al. ....... 296/203.02 |
| 6,296,303 B1 | * | 10/2001 | Kamiya et al. ................ 296/70 |
| 6,351,962 B1 | * | 3/2002 | Mizutani et al. .............. 180/90 |
| 6,411,018 B1 | * | 6/2002 | Heinz ......................... 310/363 |

FOREIGN PATENT DOCUMENTS

| DE | 195 34 568 A1 | 4/1996 |
| DE | 196 20 919 A1 | 11/1997 |
| DE | 693 28 148 T2 | 11/2000 |
| EP | 0 585 875 B1 | 3/2000 |

* cited by examiner

*Primary Examiner*—D. Glenn Dayoan
*Assistant Examiner*—Lori L Coletta
(74) *Attorney, Agent, or Firm*—Henry M. Feiereisen

(57) ABSTRACT

A dashboard support for a motor vehicle, includes a support beam extending between windshield pillars of a motor vehicle body. Associated to the support beam is an active arrangement, which includes ceramic piezoelectric elements and a controller operatively connected to the piezoelectric elements, for implementing a vibration damping.

6 Claims, 1 Drawing Sheet

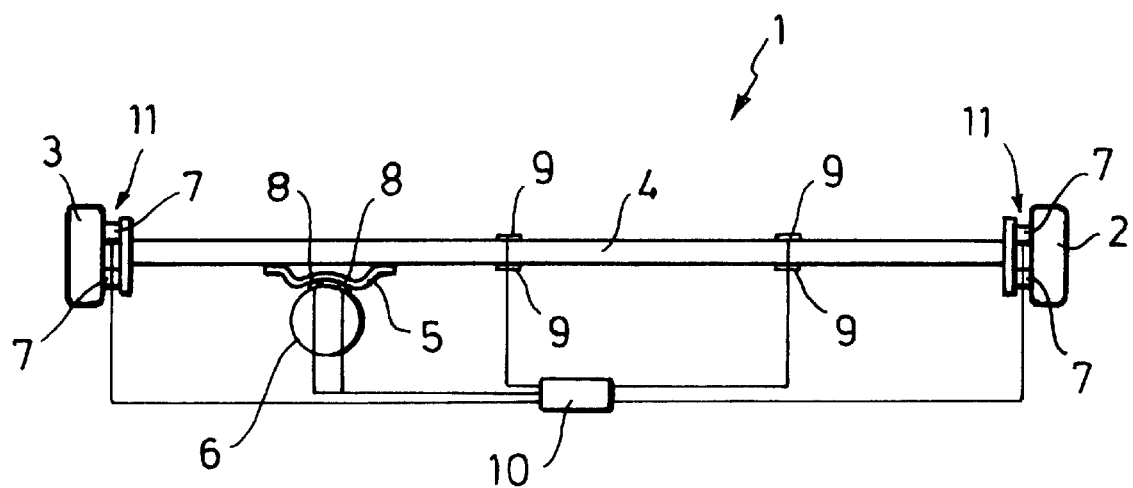

DASHBOARD SUPPORT WITH VIBRATION-DAMPING FEATURE

CROSS-REFERENCES TO RELATED APPLICATIONS

This application claims the priority of German Patent Application Serial No. 101 12 738.3, filed Mar. 16, 2001, the subject matter of which is incorporated herein by reference.

BACKGROUND OF THE INVENTION

The present invention relates, in general, to a dashboard for a motor vehicle, and in particular to a dashboard support placed transversely between windshield pillars of the vehicle body.

A dashboard support includes typically a support beam, e.g. a tube which is placed between the windshield pillars. An example of a dashboard support, involved here, is disclosed in German Pat. No. DE 196 20 919 A1. Disclosed in German Pat. No. DE 195 34 568 A1 is a dashboard support in the form of a rigid support beam. In the area of the cockpit, various mountings are provided on the dashboard for retaining the instrument panel as well as further vehicle components, such as vehicle heating, ventilating and air conditioning system, airbag, steering column, center console, fuse box or glove compartment. The dashboard support is intended to satisfy several functions. Apart from reinforcing the vehicle body, the dashboard support should be able to absorb energy in the event of a collision, to connect various spatial points and allow attachment of various mountings. In addition, the dashboard support should be suitable for operation in different frequency ranges.

To date, the cross section as well as the wall thickness of dashboard supports are sized according to the first resonant frequency. Still, the dashboard support oscillates during operation of the vehicle so that vibrations and/or structure-borne sound is generated, adversely affecting the acoustics inside the motor vehicle as well as the running behavior and riding comfort for the passengers. Attempts were made to fixate or to constructively optimize the resonant frequencies, by providing a mounting on the dashboard support for attachment of the dashboard support to the vehicle body.

European Pat. No. EP 0 585 875 B1 or German Pat. No. DE 693 28 148 T2 describe a vibration damping system for a motor vehicle, including a vibration sensor for detecting and evaluating vibration of the motor vehicle or parts thereof and vibration of air inside the vehicle. In response to vibration, two vibrators are excited in such a manner that the vehicle vibration and the air vibration are damped inside the vehicle.

It would be desirable and advantageous to provide an improved dashboard support to enhance the design freedom as far as cross section and wall thickness are concerned while reducing the overall weight.

SUMMARY OF THE INVENTION

According to one aspect of the present invention, a dashboard support for a motor vehicle, includes a support beam extending between windshield pillars of a motor vehicle body; and an active arrangement, interacting with the support beam, for implementing a vibration damping.

The present invention resolves prior art problems by associating an active arrangement for vibration damping to the support beam. When the dashboard support vibrates during operation of the vehicle, the vibration is detected by a sensor and damped by an actively produced compensating vibration and thereby effectively negated or shifted to another, especially higher, frequency range. The arrangement intervenes actively and induces periodic deformation amplitudes and voltage amplitudes to effectively obliterate the vibration or dampen the frequency in suitable phase position. Moreover, the arrangement is able to decouple interconnected components so as to further promote a vibration damping. A transmission of vibrations and of a force flux in connection areas of adjoining components is hereby avoided.

The effectiveness of the dashboard support and in particular of the active arrangement is thus based on vibration damping, a shift to other frequency ranges and/or decoupling of interconnected components. As a result, the cross section of a dashboard support according to the present invention can thus be simplified and made smaller. Also a reduction in wall thickness is possible, leading to a weight decrease. The riding comfort is enhanced and the need for separate mountings for attachment can be omitted so that the overall construction becomes simpler and the weight can be further reduced. Thus, a dashboard support according to the present invention enables an active suppression of vibrations and noise so that the running behavior as well as the riding comfort is improved.

There are various physical systems possible to provide an active vibration damping, only several of which will be detailed here. Suitable systems include components which have electrically or magnetically activateable materials as actuators and/or sensors and are operatively connected to a controller. Operation of actuator/sensor elements may be based on piezoelectric technology, magnetoresistance technology or also electro-rheological fluids.

Of course, an arrangement for active vibration damping in accordance with the present invention may also be used for retrofitting exiting dashboard supports.

According to another feature of the present invention, the active arrangement for vibration damping may include adaptive piezoelectric elements, which are arranged on the support beam, and an active controller, which is operatively connected to the piezoelectric elements. Piezoelectric elements involved here may include piezo-ceramic actuator/sensor elements which may be configured as fiber composite having embedded therein piezo-ceramic fibers and/or foils. Especially suitable is the use of thin piezo-ceramic plates, also called piezo foils, as well as piezoelectric ceramic fibers for integration in fiber composites.

Basically, it is possible to provide piezoelectric elements also on the steering column or adjoining mountings of the dashboard support.

Adaptive piezoelectric elements convert electric energy into mechanical energy without assistance of moving parts. Thus, the arrangement reacts very rapidly while still exhibiting a long service life. The piezoelectric effect is based on a mechanical deformity of certain embedded crystals under the influence of an electric field. This effect is used to realize an active excitation of the piezoelectric elements via the external controller and the generation of a counter or compensating vibration. In other words, a vibration is imparted at a frequency in near agreement with the resonant frequency of the dashboard support in a direction to compensate the vibration of the dashboard support. Examples of piezo-electric ceramic actuators include ceramic mixtures of lead, zirconate and titanate with high electromechanical activity, i.e. great relative length/thickness change when electric voltage is applied.

Piezoelectric elements may also be distributed along the dashboard support. In this way, it is possible to employ the piezoelectric elements for damage recognition. For example, when the dashboard support has cracks or is damaged as a result of breaks, the piezoelectric elements are able to sense these cracks or breaks as a result of a change in the vibration behavior.

Piezoelectric elements may be positioned in the attachment zone between the windshield pillars and the support beam. Also the attachment zone of the steering column allows the disposition of the piezoelectric elements because a major part of oscillations or vibrations caused during operation are channeled via the steering column to the dashboard support. In addition, there is the possibility to dispose the piezoelectric elements on mountings arranged on the dashboard support. The disposition of piezoelectric elements between components then realizes the intended effect of decoupling to thereby interrupt the force flux.

BRIEF DESCRIPTION OF THE DRAWING

Other features and advantages of the present invention will be more readily apparent upon reading the following description of currently preferred exemplified embodiments of the invention with reference to the accompanying drawing, in which the sole FIG. 1 is a simplified, schematic illustration of a dashboard support according to the present invention.

DETAILED DESCRIPTION OF PREFERRED EMBODIMENTS

Turning now to FIG. 1, there is shown a simplified, schematic illustration of a dashboard support according to the present invention, generally designated by reference numeral 1 and extending between windshield pillars 2, 3, indicated only here, of an automotive vehicle body in a direction transversely to the traveling direction of the vehicle body. The connection of the dashboard support 1 to the windshield pillars 2, 3 is not shown in detail here but may be realized in any manner known to the artisan. The dashboard support 1 includes a hollow support beam 4 for carrying the dashboard or instrument panel (not shown) and intended for attachment and securement of various vehicle components such as vehicle heater, ventilating and air conditioning system, airbag, steering column, denoted in FIG. 1 by reference numeral 6, center console, fuse box or glove compartment. The attachment of the steering column 6 is indicted in FIG. 1 by reference numeral 5.

Associated to the support beam 4 is an active arrangement for vibration damping. In accordance with a presently preferred embodiment, the active arrangement is implemented by providing piezoelectric elements 7, 8, 9 of ceramic material which are operatively connected to a controller 10 and unite a sensor and an actuator in a unitary structure. An example of a piezoelectric element of ceramic material includes a ceramic mixture of lead, zirconate and titanate. Structure and manner of operation of piezoelectric elements, involved here, is generally known to the artisan so that a detailed description is omitted for the sake of simplicity. The controller 10 is positioned externally in the motor vehicle. Persons skilled in the art will understand that the active arrangement must contain additional apparatus which does not appear in the foregoing FIGURE, e.g. a power source for supply of voltage, typically a 12 voltage or 24 voltage power source. For the sake of simplicity, this apparatus, or other components that may be provided, have been omitted from the FIGURE.

As shown in FIG. 1, the piezoelectric elements 7 are disposed in an attachment zone 11 between the windshield pillars 2, 3 and the support beam 4, whereas the piezoelectric elements 8 are disposed between the attachment 5 of the steering column 6 and the steering column 6 itself. The piezoelectric elements 9 are positioned on the support beam 4, e.g. through gluing.

The arrangement for vibration damping actively influences via the provided ceramic piezoelectric elements 7, 8, 9 the vibration behavior of the dashboard support 1. Natural vibrations of the dashboard support 1 encountered during operation of the motor vehicle are sensed, evaluated, and a compensating vibration is induced via the actuators and controlled by the direction of the electric field and the direction of polarization. As a consequence, a periodic deformation amplitude and voltage amplitude is generated which realizes in suitable phase position an obliteration or damping of the vibration or a shift or decoupling. Undesired vibrations caused during operation are thus counteracted automatically at the location where the vibration is generated, thereby realizing a vibration damping and damping of structure-borne sound. As a consequence, the cross section as well as the wall thickness of the dashboard support 1 can be reduced, so that a weight reduction can be achieved. Mountings for securement of the dashboard support 1 may be omitted or at least can be configured at lighter weight, further reducing the overall weight.

While the invention has been illustrated and described as embodied in a dashboard support with vibration-damping feature, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and their equivalents:

What is claimed is:

1. A dashboard support for a motor vehicle, comprising a support beam extending between windshield pillars of a motor vehicle body; and an active arrangement, interacting with the support beam, for implementing a vibration damping, said active arrangement for vibration damping including adaptive piezoelectric elements arranged on the support beam, and a controller operatively connected to the piezoelectric elements, wherein a first plurality of said piezoelectric elements is disposed in an attachment zone between the windshield pillars and the support beam, and wherein a second plurality of said piezoelectric elements is disposed in a steering column attachment zone to the support beam.

2. The dashboard support of claim 1, wherein each said piezoelectric element is a fiber composite having embedded therein at least one of piezo-ceramic fibers and foils.

3. The dashboard support of claim 1, wherein a third plurality of said piezoelectric elements is disposed on the support beam.

4. A dashboard support for a motor vehicle, comprising a support beam extending between windshield pillars of a motor vehicle body for support of a dashboard; and an arrangement, interacting with the support beam, for automatically imparting a vibration at a frequency in near agreement with a resonant frequency of the support beam in a direction to compensate and dampen a vibration of the support beam, said arrangement including adaptive piezoelectric elements arranged on the support beam, and a controller operatively connected to the piezoelectric elements, wherein a first plurality of said piezoelectric elements is disposed in an attachment zone between the windshield pillars and the support beam, and wherein a second plurality of said piezoelectric elements is disposed in a steering column attachment zone to the support beam.

5. The dashboard support of claim 4, wherein each said piezoelectric element is a fiber composite having embedded therein at least one of piezo-ceramic fibers and foils.

6. The dashboard support of claim 4, wherein a third plurality of said piezoelectric elements is disposed on the support beam.

* * * * *

UNITED STATES PATENT AND TRADEMARK OFFICE
CERTIFICATE OF CORRECTION

PATENT NO.   : 6,572,178 B2
DATED        : June 3, 2003
INVENTOR(S)  : Härtel et al.

It is certified that error appears in the above-identified patent and that said Letters Patent is hereby corrected as shown below:

<u>Title page,</u>
Item [75], correct second inventor's data as follows:

-- [75]  Björn Schaffranek, Borchen (DE) --

Signed and Sealed this

Twenty-third Day of December, 2003

JAMES E. ROGAN
*Director of the United States Patent and Trademark Office*